US010025053B2

(12) United States Patent
Hudson, II et al.

(10) Patent No.: US 10,025,053 B2
(45) Date of Patent: Jul. 17, 2018

(54) OPTICAL FIBER BUNDLE

(71) Applicant: Corning Optical Communications LLC, Hickory, NC (US)

(72) Inventors: Harold Edward Hudson, II, Conover, NC (US); William Carl Hurley, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/234,108

(22) Filed: Aug. 11, 2016

(65) Prior Publication Data
US 2017/0052337 A1 Feb. 23, 2017

Related U.S. Application Data

(60) Provisional application No. 62/206,445, filed on Aug. 18, 2015.

(51) Int. Cl.
*G02B 6/44* (2006.01)
(52) U.S. Cl.
CPC ........... *G02B 6/4433* (2013.01); *G02B 6/441* (2013.01); *G02B 6/4436* (2013.01); *G02B 6/4471* (2013.01); *G02B 6/4495* (2013.01)
(58) Field of Classification Search
CPC ..... G02B 6/4433; G02B 6/441; G02B 6/4436
USPC ........................................................ 385/110
See application file for complete search history.

(56) References Cited

U.S. PATENT DOCUMENTS

| 3,773,449 | A | * | 11/1973 | Hager | ..................... B29C 47/02 425/114 |
|---|---|---|---|---|---|
| 6,453,097 | B1 | * | 9/2002 | Newton | ............... G02B 6/4402 385/102 |
| 6,483,971 | B2 | | 11/2002 | Gaillard et al. | |
| 6,546,712 | B2 | | 4/2003 | Moss et al. | |
| 8,620,124 | B1 | | 12/2013 | Blazer et al. | |
| 8,913,862 | B1 | | 12/2014 | Emmerich et al. | |
| 8,934,747 | B2 | | 1/2015 | Conrad et al. | |
| 8,995,809 | B2 | | 3/2015 | Gimblet et al. | |
| 2003/0002831 | A1 | | 1/2003 | Chandraiah et al. | |
| 2004/0120665 | A1 | | 6/2004 | Hurley et al. | |
| 2007/0031096 | A1 | | 2/2007 | Moorjani et al. | |
| 2007/0140632 | A1 | | 6/2007 | Sasaki et al. | |
| 2009/0022462 | A1 | | 1/2009 | Papazoglou et al. | |

(Continued)

OTHER PUBLICATIONS

Ellis, T., et al., U.S. Appl. No. 15/060,864, "Optical Fiber Bundle," filed Mar. 4, 2016.

(Continued)

*Primary Examiner* — Jerry Blevins
(74) *Attorney, Agent, or Firm* — William D. Doyle

(57) ABSTRACT

An optical communication cable bundle is provided. The cable bundle includes a bundle jacket having an inner surface defining a bundle passage and an outer surface defining an exterior surface of the cable bundle, and a plurality of optical fiber subunits located within the bundle passage and surrounded by the bundle jacket, each optical fiber subunit having a subunit jacket defining a subunit passage and a plurality of optical fibers located with the subunit passage. A thickness of the bundle jacket is less than a thickness of each of the subunit jackets and the bundle jacket is extruded tight around the subunit jackets to couple the subunits and the bundle jacket.

14 Claims, 2 Drawing Sheets

(56) References Cited

U.S. PATENT DOCUMENTS

| | | | |
|---|---|---|---|
| 2010/0067855 A1* | 3/2010 | Barker | G02B 6/4429 |
| | | | 385/109 |
| 2010/0209059 A1* | 8/2010 | Conrad | G02B 6/0365 |
| | | | 385/110 |
| 2010/0329615 A1 | 12/2010 | Rhyne et al. | |
| 2011/0211793 A1 | 9/2011 | Barrett et al. | |
| 2012/0063731 A1 | 3/2012 | Fitz et al. | |
| 2012/0243841 A1 | 9/2012 | Hurley et al. | |
| 2012/0281953 A1 | 11/2012 | Choi et al. | |
| 2014/0199036 A1 | 7/2014 | Hurley et al. | |
| 2015/0086168 A1* | 3/2015 | Blazer | G02B 6/4413 |
| | | | 385/102 |

OTHER PUBLICATIONS

International Search Report and Written Opinion PCT/US2016/045315 dated Dec. 8, 2016.

\* cited by examiner

OPTICAL FIBER BUNDLE

CROSS-REFERENCE TO RELATED APPLICATIONS

This application claims the benefit of priority under 35 U.S.C. § 119 to U.S. Provisional Application No. 62/206,445, filed on Aug. 18, 2015, and is incorporated herein by reference.

BACKGROUND

The disclosure relates generally to optical communication cables and more particularly to optical communication cables including a bundle of multiple optical fiber subunits. Optical communication cables have seen increased use in a wide variety of electronics and telecommunications fields. Optical communication cables contain or surround one or more optical communication fibers. The cable provides structure and protection for the optical fibers within the cable. Bundles of connectorized optical fiber subunits may be used to interconnect equipment within a network installation or data center.

SUMMARY

One embodiment of the disclosure relates to an optical communication cable bundle. The optical communication cable bundle includes a bundle jacket. The bundle jacket includes an inner surface defining a bundle passage and an outer surface defining an exterior surface of the cable bundle. The optical communication cable bundle includes a plurality of optical fiber subunits located within the bundle passage and surrounded by the bundle jacket. Each optical fiber subunit includes a subunit jacket defining a subunit passage and a plurality of optical fibers located with the subunit passage. A thickness of the bundle jacket is less than a thickness of each of the subunit jackets.

An additional embodiment of the disclosure relates to a bundle of optical fibers. The bundle of optical fibers includes an outermost bundle layer including an inner surface defining a bundle passage and an outer surface defining an exterior surface of the bundle. The outermost bundle layer is formed from a first polymer material. The bundle of optical fibers includes a plurality of optical fiber subunits located within the bundle passage and surrounded by the outermost bundle layer. Each optical fiber subunit includes a subunit jacket defining a subunit passage, and the subunit jacket is formed from a second polymer material different from the first polymer material. Each optical fiber subunit includes a plurality of optical fibers located with the subunit passage. Each subunit jacket has a tensile strength and a tear strength, and the outermost bundle layer has a tensile strength and a tear strength. The tensile strength of the outermost bundle layer is less than the tensile strength of the subunit jacket, and the tear strength of the outermost bundle layer is less than the tear strength of the subunit jacket.

An additional embodiment of the disclosure relates to an optical communication cable bundle. The optical communication cable bundle includes a bundle jacket including an outer surface defining an exterior surface of the cable bundle. The bundle jacket is formed from a first extrudable polymer material. The optical communication cable bundle includes a plurality of optical fiber subunits surrounded by the bundle jacket. Each optical fiber subunit includes a subunit jacket, and the subunit jacket is formed from a second extrudable polymer material different from the first polymer material. Each optical fiber subunit includes at least one optical fibers surrounded by the subunit jacket. The second polymer material includes a fire resistant material, and the first material has an oxygen limiting index less than an oxygen limiting index of the second material.

In accordance with yet other aspects of the present disclosure, an optical communication cable bundle includes a bundle jacket having an inner surface defining a bundle passage and an outer surface defining an exterior surface of the cable bundle, and a plurality of optical fiber subunits located within the bundle passage and surrounded by the bundle jacket, each optical fiber subunit having a subunit jacket defining a subunit passage and a plurality of optical fibers located with the subunit passage. A thickness of the bundle jacket is less than a thickness of each of the subunit jackets and the bundle jacket is extruded tight around the subunit jackets to couple the subunits and the bundle jacket.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
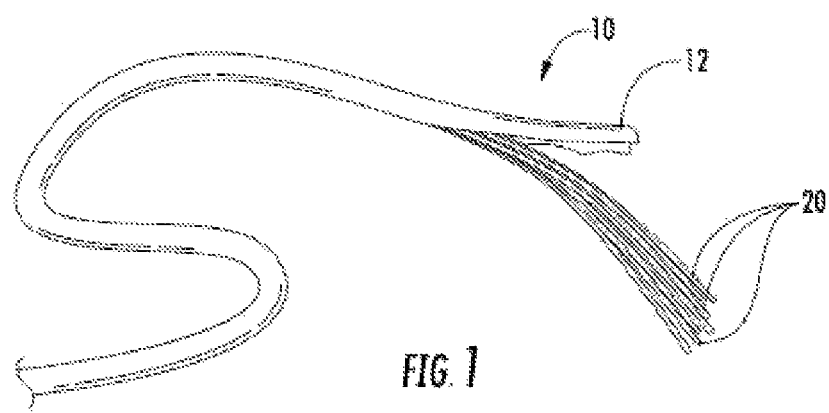
FIG. 1 is a perspective view of a bundle of optical fiber subunits showing access to the optical fiber subunits according to an exemplary embodiment.

Referring generally to the figures, various embodiments of an optical communication cable bundle (e.g., a bundle of optical fiber carrying components, a bundle of optical fiber subunits, etc.) are shown. In general, the cable bundle embodiments disclosed herein are configured to support a large number of optical fibers within a relatively small cross-sectional area while at the same time allowing for easy access to the optical fibers for routing and connectorization as needed. In various embodiments, the cable bundle includes a relatively thin and flexible bundle jacket that surrounds and holds together a plurality of optical fiber subunits. The bundle jacket is pinchable or tearable by hand so that the optical fiber subunits are easily accessible without the need for specialized structures (e.g., ripcords) or tools to open the bundle jacket. Each optical fiber subunit includes a subunit jacket surrounding one or more optical fiber. In contrast to the outer bundle jacket, the subunit jacket is relatively strong and provides protection to the optical fibers once the bundle jacket is opened to access the optical fiber subunits.

In certain embodiments, this arrangement in which the outermost layer of the optical fiber cable bundle is relatively weak and flexible compared to interior layers, is provided by utilizing an extrudable, flexible material for the bundle jacket that may be extruded at relatively low thicknesses such that the final bundle jacket is easy to open by hand. In contrast to certain optical fiber cable bundles that utilize an outer layer of mesh material, the optical cable bundles discussed herein may be made at relatively high line speeds provided by extrusion of the outer layer.

In specific embodiments, the contrasting physical characteristics of the inner and outer layers of the optical fibers discussed herein are provided by utilizing different materials with different fire resistant characteristics for the bundle jacket and the subunit jacket. For example, in one embodiment, the bundle jacket is formed from a polymer material that does not include the highly filled, fire resistant additives common in many cable jacket outer layers, and the lack of these components allows the bundle jacket to be more flexible as compared to materials that include such additives. In contrast, in such embodiments, the subunit jackets are formed from a polymer material that includes fire resistant additives. Thus, in these embodiments, it is the material of the subunit jackets that provides fire resistance to the bundle, rather than the outermost layer providing fire resistance to the bundle. In various embodiments, this arrangement of fire resistant material provides an optical fiber bundle that passes various fire rating tests (e.g., the plenum burn test, the riser burn test, etc.) despite supporting a large number of optical fibers (e.g., 64 optical fibers, 92 optical fibers, 144 optical fibers, 192 fibers, etc.) while at the same time providing a thin, flexible and easily openable outer bundle layer having a relatively small outer diameter.

In various embodiments, the optical fiber bundle may be used to distribute fibers within a network data center. In some embodiments, the optical fiber bundles discussed herein provide a "plug and play" solution for distributing fibers in a network data center, and in these embodiments, one or more subunits may have an optical connector located at the end of the subunit for communicably connecting the optical fibers of the subunit to network data center equipment. In various embodiments, the easy, "no tool access" provided by the bundle jacket in combination with the compact optical fiber bundle provided by the low bundle jacket thickness, provides for an optical fiber bundle that useful in modern network installations. In particular, the small total size of the bundle allows the network operator to distribute a large number of fibers throughout the data center allowing a large number of fibers to fit within data center equipment such as cable trays. In addition, the easy access to the subunits allows the network operator to access, distribute and connect particular optical fiber subunits to data center equipment without the use of tools or specialized cable structures to open the bundle jacket.

Figure 2:
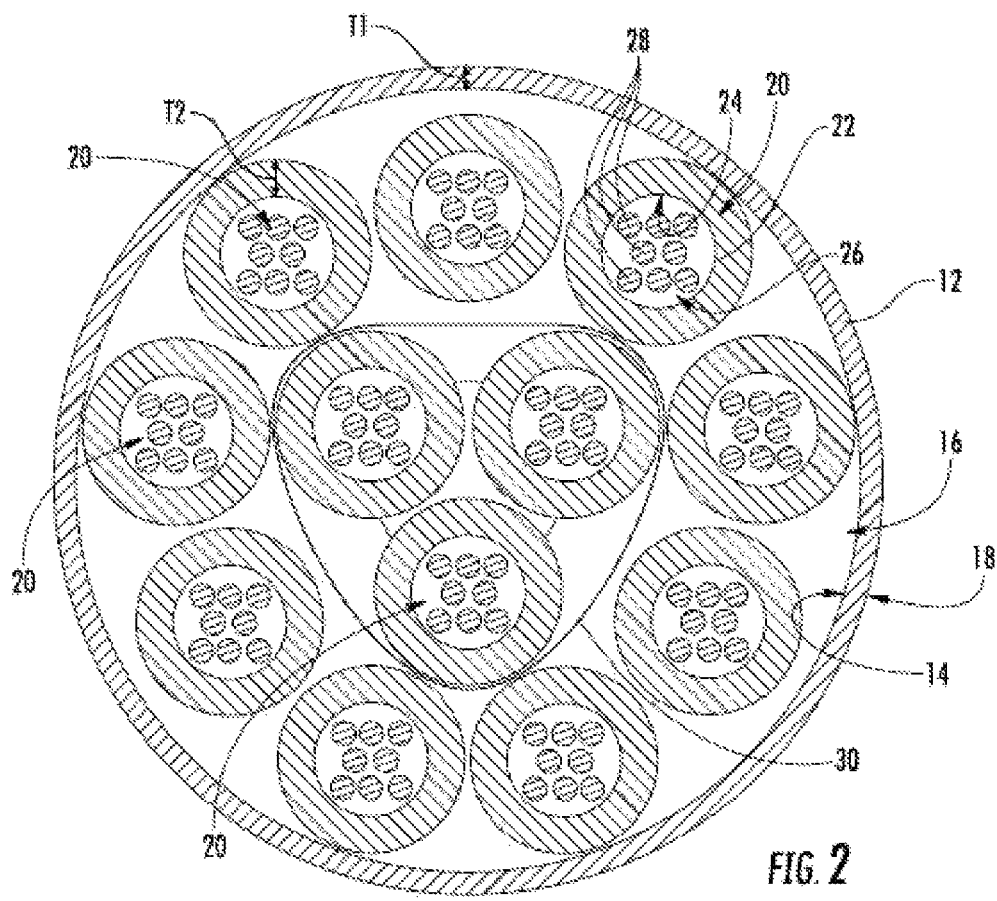
FIG. 2 is a cross-sectional view of the bundle of FIG. 1 according to an exemplary embodiment.

Referring to FIG. 1 and FIG. 2, an optical communication cable bundle or bundle of optical fibers, shown as bundle 10, is shown according to an exemplary embodiment. Bundle 10 includes an outermost bundle layer, shown as a bundle jacket 12, having an inner surface 14 that defines a bundle passage, shown as central channel 16, and bundle jacket 12 includes an exterior surface 18 that defines an exterior surface of bundle 10. As will be generally understood, inner surface 14 of bundle jacket 12 defines an internal area or region within which the various cable components discussed below are located.

In various embodiments, bundle 10 is a high density optical fiber cable that includes a large number of optical fibers in a cable with a relatively low cross-sectional area. In such embodiments, bundle 10 includes a plurality of optical fiber subunits, shown as optical fiber subunits 20. Each subunit 20 includes a subunit jacket, shown as subunit jacket 22, having an inner surface 24 defining a subunit passage or bore 26. A plurality of individual, elongate optical transmission elements, shown as optical fibers 28 are located within bore 26 of each subunit 20. In various embodiments, bundle jacket 12 may be colored and/or printed to identify the subunits 20 and/or optical fibers 28 located within bundle jacket 12.

As shown in FIG. 1 and FIG. 2, bundle 10 may include a number of subunits 20. In various embodiments, bundle 10 may include at least four subunits 20, and each subunit 20 includes at least eight optical fibers 28. In the embodiment shown, bundle 10 includes a central group of three subunits 20 and an outer group of nine subunits 20 surrounding the inner group of three subunits. In various embodiments, bundle 10 may include any number of subunits 20 as may be desired for particular applications. In various embodiments, bundle 10 includes 2, 3, 4, 5, 6, 8, 10, 14, 16, 20, etc. subunits 20 surrounded by bundle jacket 12.

Further, as shown in FIG. 1 and FIG. 2, each subunit 20 of bundle 10 is substantially the same as the other subunits 20 of bundle 10. In the specific embodiment shown, each subunit 20 includes eight optical fibers 28 and has a subunit jacket 22 that is substantially the same (e.g., same thickness and same material) as the other subunit jackets 22. In another embodiment, subunits 20 may each include twelve optical fibers 28. In various embodiments, each subunit 20 may include any number of optical fibers 28 as needed for a particular application. For example in other embodiments, each subunit 20 may include 2, 3, 4, 5, 6, 7, 8, 10, 16, 20, 24, 28, 32, etc. optical fibers 28.

In other embodiments, bundle 10 may include multiple different subunit types or arrangements such that differently configured subunits 20 are located within a single bundle jacket 12. In such embodiments, at least one subunit 20 is different from at least one other subunit 20. For example, at least one subunit 20 may include more or less optical fibers 28 than at least one other subunit 20. As another example, at least one subunit 20 may include a subunit jacket 22 that is different (e.g., thicker, thinner, made from a different material, different size, different shape, etc.) than at least one other subunit jacket 22 of one other subunit 20.

In addition, while the embodiments discussed herein primarily relate to optical fiber bundles having a bundle jacket surrounding separate or ungrouped subunits 20. In various embodiments, two or more subunits 20 may be surrounded by an intermediate sheath or layer that acts to hold a subgroup of subunits 20 together within bundle jacket 12.

In addition, bundle 10 may include various other cable structures or components that may be desirable for a particular application. For example, bundle 10 may include one or more binder, shown as binder yarn 30, that surrounds and helps hold together subunits 20 within bundle jacket 12. In addition, bundle 10 may include various water blocking materials such as water blocking powders, tapes or yarn strands. Bundle 10 may also include one or more tensile strength element, such as elongate metal rods, glass reinforced plastic rods or aramid yarn strands. In one embodiment, each subunit 20 includes at least one aramid yarn strand located within subunit passage 26, and in certain embodiments, bundle 10 includes no tensile strength strands located in channel 16 outside of subunits 20.

As shown in FIG. 1, bundle 10 is configured to allow bundle jacket 12 to be split open such that optical fiber subunits 20 can be accessed and routed, as needed, independently of each other. In various embodiments, bundle jacket 12 is configured to allow the user to open bundle jacket 12 by hand, and in specific embodiments, bundle jacket 12 is "pinchable" such that a pinching action is able to collapse and tear bundle jacket 12 open. Further, subunit jackets 22 provide sufficient structure to protect optical fibers 28 following splitting of bundle jacket 12. In various embodiments, the materials and/or geometry of bundle jacket 12 and of subunit jacket 22 are selected or configured to provide the various functionalities described herein.

In various embodiments, bundle jacket 12 and subunit jacket 22 are configured differently from each other in order to provide the combination of the easy to open outer layer of bundle jacket 12 and the protective inner layer of subunit jacket 22. For example, in various embodiments, bundle jacket 12 has a thickness in the radial direction, shown as T1, and subunit jacket 22 has a thickness in the radial direction, shown as T2. As shown in FIG. 2, T1 is less than T2. T1 is selected such that bundle jacket 12 can be opened by hand, and T2 is selected to provide sufficient protection to optical fibers 28 following opening of bundle jacket 12.

In specific embodiments, T1 is less than 70% of T2, specifically is less than 60% of T2 and more specifically is less than 50% of T2. In specific embodiments, T1 is between 0.05 mm and 0.35 mm, and more specifically is between 0.1 mm and 0.2 mm. In such embodiments, T2 is between 0.25 mm and 0.5 mm, specifically is between 0.25 mm and 0.35 mm and more specifically is about 0.3 mm (e.g., 0.3 mm plus or minus 0.01 mm). Thus, in contrast to many optical cable designs in which the outermost cable jacket layer is the thickest jacket layer in the cable, optical fiber bundle 10 has an outermost polymer layer that is substantially thinner than the inner polymer layers of the optical fiber subunits. In such embodiments, the low thickness of bundle jacket 12 provides an optical communications bundle in which the outermost layer does not significantly contribute to burn performance.

In various embodiments, the low thickness of bundle jacket 12 provides an optical communications bundle in which the maximum outer dimension of bundle jacket 12 is smaller than is typically needed to provide a cable with a similarly large number of optical fibers. In various embodiments, each subunit 20 has an outer diameter of about 2 mm, and in a specific embodiment, bundle 10 includes 16 subunits each including twelve optical fibers 28. In this embodiment utilizing thin bundle jacket 12, the total maximum outer diameter of bundle 10 is between 8 mm and 14 mm and more specifically is between 9 mm and 10 mm.

Further, bundle jacket 12 and subunit jacket 22 each may be configured (either through the differential thickness, or through formation from different materials having different physical properties) to each provide different degrees of strength or breakage resistance to bundle 10. For example, as noted above, bundle jacket 12 is relatively easy to open by hand to allow easy access to subunits 20, and subunit jackets 22 may be difficult to open hand, providing protection to optical fibers 28. In specific embodiments, each subunit jacket 22 has a tensile strength and a tear strength, and bundle jacket 12 has a tensile strength and a tear strength. In such embodiments, the tensile strength of bundle jacket 12 is less than the tensile strength of at least one subunit jacket 22. In a specific embodiment, the tensile strength of bundle jacket 12 is less than the tensile strength of each of subunit jackets 22 of bundle 10. In addition, in various embodiments, the tear strength of bundle jacket 12 is less than the tear strength of at least one subunit jacket 22. In a specific embodiment, the tear strength of bundle jacket 12 is less than the tear strength of each of subunit jackets 22 of bundle 10.

In various embodiments, the tensile strength of bundle jacket 12 is less than 2000 psi, specifically is less than 1800 psi and more specifically is about 1750 psi (e.g., 1750 psi plus or minus 1 percent). In some such embodiments, the tensile strength of bundle jacket 12 is greater than 500 psi and more specifically is greater than 1000 psi. In addition, in various embodiments, the tensile strength of subunit jacket 22 is more than 2200 psi, specifically is more than 2400 psi, and more specifically is about 2500 psi (e.g., 2500 psi plus or minus 1 percent). In some such embodiments, the tensile strength of subunit jacket 12 is less than 4000 psi and more specifically is less than 3000 psi. In various embodiments, the tensile strength of bundle jacket 12 is less than 80% of the tensile strength of subunit jacket 22, specifically is less than 75% of the tensile strength of subunit jacket 22, and more specifically is about 70% (e.g., 70% plus or minus 5%) of the tensile strength of subunit jacket 22. In certain embodiments, bundle jacket 12 has low elongation of less than 300 percent. In various embodiments, the tear strengths discussed herein are determined using ASTM D624, and the tensile strengths and elongation percentages are determined using ASTM D638.

Further, in various embodiments, bundle jacket 12 applies a relatively low, inward, radially-directed force onto subunits 20 that is sufficient to hold subunits 20 together in bundle 10. However, in a specific embodiment, the relatively low, inward, radially-directed force provided by bundle jacket 12 is not sufficient to hold subunits 20 in fixed positions relative to each other within bundle jacket 12. For example, in various embodiments, subunits 20 are unstranded (e.g., subunits 20 extend in a relatively straight line between opposing ends of bundle jacket 12). Thus, in these embodiments, bundle jacket 12 is different from cable designs that utilize an extruded binder layer to hold the components of stranded cable (e.g., an SZ-stranded cable) in place.

In addition to providing differential strength and having differential thicknesses, the materials selected for bundle jacket 12 and subunit jacket 22 may be different material types having different fire resistance characteristics. In various embodiments, bundle jacket 12 is formed from a first extrudable polymer material, and subunit jackets 22 are formed from second extrudable polymer material that is different from the first extrudable polymer material. In various embodiments, bundle jacket 12 is formed from a first polyvinyl chloride (PVC) material and subunit jacket 22 is formed from a second PVC material that is different from the first PVC material. In a specific embodiment, bundle jacket 12 is formed from a polymer material that includes little or no fire resistant filler materials, and subunit jackets 22 are formed from a polymer material that does include fire resistant filler materials. In a specific embodiment, bundle jacket 12 includes a smoke reducing additive, and in a specific embodiment, bundle jacket 12 is formed from a low smoke zero halogen (LSZH) material.

In various embodiments, bundle 10 is a fire resistant bundle of optical fiber cables suitable for indoor use. In various embodiments, bundle 10 includes materials and is designed to pass the plenum burn test (NFPA 262) and/or the riser burn test (UL1666). In another embodiment, bundle 10 is a fire-resistant, non-corrosive cable (IEC 60332 3). In various embodiments, optical fibers 28 include an outer protective coating, such as UV-cured urethane acrylate materials, that act to protect the inner glass fiber. However, these outer coating materials may generate significant heat when exposed to fire such that as the optical fiber count and optical fiber density of a particular cable increase, the burn resistance of the bundle 10 tends to decrease. However, in various embodiments, by providing subunits 20 having fire resistant subunit jackets surrounding groups of optical fibers 28, bundle 10 is specifically structured to provide a relatively high fiber count, high fiber density cable while still maintaining satisfactory burn resistance characteristics.

In various embodiments, subunit jackets 22 are formed from an extrudable polymer material that includes one or more material, additive or component embedded in the polymer material that provides fire resistant characteristics such as relatively low heat generation, low heat propagation, low flame propagation, and/or low smoke production. In various embodiments, the fire resistant material may include an intumescent material additive embedded in the polymer material. In other embodiments, the fire resistant material includes a non-intumescent fire resistant material embedded in the polymer material, such as a metal hydroxide, aluminum hydroxide, magnesium hydroxide, etc., that produces water in the presence of heat/fire which slows or limits heat transfer along the length of subunit 20.

In various embodiments, subunit jacket 22 may include particles of intumescent material embedded in the material of the subunit jackets 22 forming an intumescent layer. In this embodiment, as heat is transferred through subunit jackets 22, the intumescent material expands blocking air flow through the bore of the respective subunit jacket 22. The intumescent material also forms a char layer that has low heat conductivity further limiting heat penetration into the middle of the cable. In various embodiments, the intumescent material may include sodium silicates, graphite or one or more of the Exolit materials available from Clariant. In various embodiments, the fire resistant material of subunit jacket 22 may be a fire resistant polyethylene, polypropylene, PVC, or any suitable fire resistant polymer material used in optical fiber cable construction.

In various embodiments, the difference between fire resistant components in the materials of bundle jacket 12 and subunit jacket 22 results in an optical fiber bundle in which the exterior layer, bundle jacket 12, has a low limiting oxygen index (LOI), and the inner layers, e.g. subunit jackets 22, have a higher LOI than bundle jacket 12. In various, embodiments, subunit jackets 22 have an LOI greater than 40% and more specifically greater than 50%, and bundle jackets 12 have an LOI less than 40% and more specifically less than 30%. In certain embodiments, the fire resistant material of subunit jacket 22 may be a highly-filled polymer material with a LOI of 50% or higher, and bundle jacket 12 may be formed from a less highly-filled polymer material with an LOI of 30% or less. In some embodiments, both bundle jacket 12 and subunit jacket 22 may be formed from materials with relatively low fire resistance, and in such embodiments, bundle 10 may utilize embedded intumescent materials, fire retardant tapes, etc. to provide the desired fire resistant properties. In such embodiments, bundle 10 may include a fire retardant tape, such as mica tape, wrapped around and outside of subunits 20.

In various embodiments, by using an extrudable polymer material for bundle jacket 12, bundle jacket 12 may be extruded around subunits 20 during formation of bundle 10. Thus, it is believed that use of extrusion to bundle subunits 20 provides a fast and efficient way to aggregate subunits 20 into a bundle for use in a network installation or data center as compared to assemblies that use a mesh outer layer to aggregate subunits 20 into a bundle. In particular embodiments, extrusion of bundle jacket 12 around subunits 20 may allow for production bundle 10 at speeds between at least 30 to 50 meters per minute.

Figure 3:
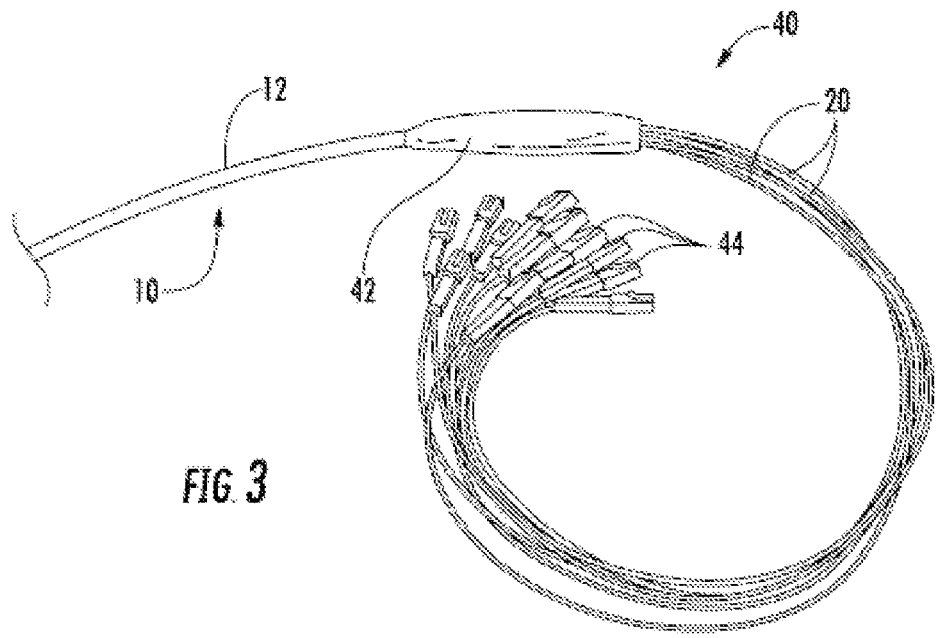
FIG. 3 is a perspective view of the bundle of FIG. 1 following connectorization according to an exemplary embodiment.

FIG. 3 shows a cable assembly 40 formed from bundle 10 after subunits 20 have been accessed through bundle jacket 12 and prior to connection to datacenter equipment. As shown, to secure the access point to subunits 20, a structure 42 is coupled to bundle jacket 12 at the point at which subunits 20 exit the opened bundle jacket 12. Fiber optic connectors 44 are shown coupled to ends of each subunits 20. In various embodiments, both ends (e.g., both upstream and downstream ends) of subunits 20 are terminated in connectors 44 facilitating interconnection of data center equipment using bundle 10. In general, each fiber optic connector 44 is coupled to optical fibers 28 of the subunit 20 to which it is attached, and connector 44 facilitates connection of optical fibers 28 to the various datacenter equipment that bundle 10 services. Accordingly, in the embodiment shown, connector 44 is an eight fiber connector configured to communicate signals from each of the eight optical fibers of the respective subunit 20. In particular embodiments, bundle 10 may be used for installations in which bundle 10 is placed by hand into a supporting or guide structure such as a cable tray.

Figure 4:
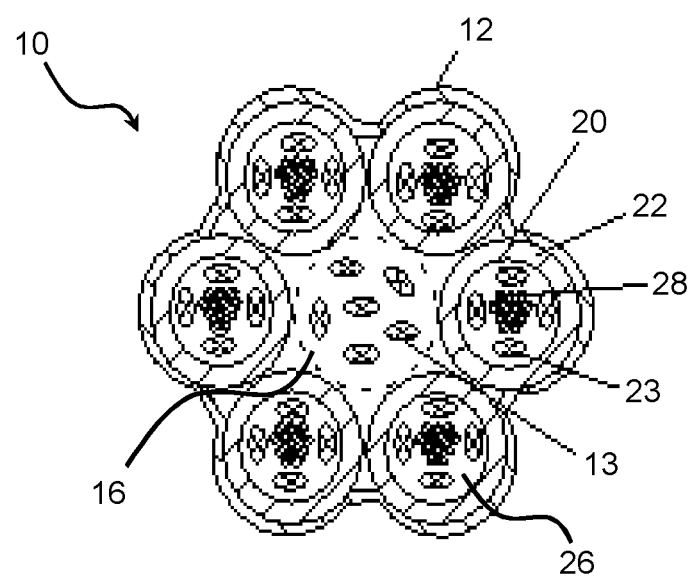
FIG. 4 is a cross-sectional view of a bundle of optical fiber subunits showing a bundle jacket drawn tight around the optical fiber subunits, in accordance with aspects of the present disclosure.

As shown in FIG. 4, bundle 10 may incorporate one or more tensile strength elements, such as elongate metal rods, glass reinforced plastic rods or aramid yarn strands. In accordance with aspects of the present disclosure, tensile strength elements 13 may be provided in channel 16. For example, a plurality of tensile strength elements 13 may be centrally located in channel 16 and/or dispersed throughout channel 16, such as between the subunits 20. In accordance with yet other aspects of the present disclosure, each subunit 20 may include at least one subunit strength member 23 located within subunit passage 26.

As also illustrated in FIG. 4, the bundle jacket 12 may have a wall thickness that is between 20% and 150% of the thickness of the subunit jackets 22, which may be in the range of 0.1 mm to 0.4 mm, for example. Furthermore, the thin jacket may be drawn down tight against the subunits 20 to hold the subunits 20 together as a cohesive bundle of subunits. In this embodiment, because the subunits 20 are bundled tightly together, the bundled subunits 20 act as a unit, providing both strength and robustness to the cable. For example, crush loads are not carried by the outer jacket like a conventional cable but the loads are distributed among the subunits that are acting in unity. The embodiment shown in FIG. 4 couples the subunit jackets 22 to the bundle jacket 12. The increased coupling between subunits 20 and the bundle jacket 12 provides a more robust cable that can survive harsher installation handling.

To provide the tight coupling described above, a vacuum may be applied to the extrusion line to cause the bundle jacket 12 to be pulled down tightly against the subunits 20 of the bundle 10. In accordance with aspects of the present disclosure, there is sometimes a tendency for the bundle jacket 12 to tack or stick to the subunit jackets 12. Optical attenuation may occur in the cable when the bundle jacket 12 sticks to the subunit jackets 22 because the contraction force of the bundle jacket 12 as it cools will buckle the subunit that is stuck to it. Conventional methods to overcome this tendency of the bundle jacket 12 to tack or stick to the subunit jackets 22 is to add a layer of talc between the subunits 20 and the bundle jacket 12 to prevent the jacket 12 from sticking to the subunits. However, in accordance with aspects of the present disclosure, the bundle jacket 12 is made to have a lower strength than the subunit jacket 22 so that as the bundle jacket 12 cools, the bundle jacket 12 does not have the strength to buckle any of the subunits 20 that may have tacked to the bundle jacket 12.

In various embodiments, subunits 20 can include a wide variety of optical fibers including multi-mode fibers, single mode fibers, bend insensitive fibers, etc. In various embodiments, bundle jacket 12 and subunit jacket 22 may be formed from a variety of materials used in cable manufacturing, such as polyethylene, polyvinyl chloride (PVC), polyvinylidene difluoride (PVDF), nylon, polypropylene, polyester or polycarbonate and their copolymers. In addition, the material of bundle jacket 12 and subunit jacket 22 may include small quantities of other materials or fillers that provide different properties to the material of bundle jacket 12. For example, the material of bundle jacket 12 may include materials that provide for coloring, UV/light blocking (e.g., carbon black), fire resistance as discussed above, etc.

While the specific cable embodiments discussed herein and shown in the figures relate primarily to bundles and subunits that have a substantially circular cross-sectional shape defining substantially cylindrical internal bores, in other embodiments, the bundles and subunits discussed herein may have any number of cross-sectional shapes. For example, in various embodiments, bundle jacket 12 and subunit jacket 22 may have an oval, elliptical, square, rectangular, triangular or other cross-sectional shape. In such embodiments, the passage or lumen of the bundle jacket 12 and subunit jacket 22 may be the same shape as or a different shape than the shape of bundle jacket 12 and subunit jacket 22, respectively. In some embodiments, bundle jacket 12 and subunit jacket 22 may define more than one channel or passage. In such embodiments, the multiple channels may be of the same size and shape as each other or may each have different sizes or shapes.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In addition to the subunits 20 discussed herein, optical fiber subunits may include optical fiber ribbons, tight-buffered optical fibers, optical fiber carrying buffer tubes, optical fiber micromodules, etc.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical communication cable bundle comprising:
   a bundle jacket including an inner surface defining a bundle passage and an outer surface defining an exterior surface of the cable bundle, wherein the bundle jacket is an outermost layer of the cable bundle; and
   a plurality of optical fiber subunits located within the bundle passage and surrounded by the bundle jacket, each optical fiber subunit comprising:
   a subunit jacket defining a subunit passage; and
   a plurality of optical fibers located with the subunit passage;
   wherein a thickness of the bundle jacket is less than a thickness of each of the subunit jackets and the bundle jacket is extruded tight around the subunit jackets to couple the subunits and the bundle jacket; and
   wherein each of the subunit jackets is formed from a first extrudable polymer material that includes a fire resistant material having an oxygen limiting index of greater than 40%, wherein the bundle jacket is formed from a second extrudable polymer material having an oxygen limiting index of less than 40%.

2. The optical communication cable bundle of claim 1, wherein the thickness of the bundle jacket is less than 70% of the thickness of the subunit jackets.

3. The optical communication cable bundle of claim 1, wherein the thickness of the bundle jacket is between 0.05 mm and 0.35 mm, and the thickness of each of the subunit jackets is between 0.25 mm and 0.5 mm.

4. The optical communication cable bundle of claim 1, wherein each subunit jacket has a tensile strength and a tear strength and the bundle jacket has a tensile strength and a tear strength, wherein the tensile strength of the bundle jacket is less than the tensile strength of the subunit jacket, wherein the tear strength of the bundle jacket is less than the tear strength of the subunit jacket.

5. The optical communication cable bundle of claim 4, wherein the tensile strength of the bundle jacket is less than 80% of the tensile strength of the subunit jacket.

6. The optical communication cable bundle of claim 4, wherein the tensile strength of the bundle jacket is less than 2000 psi and the tensile strength of the subunit jacket is greater than 2200 psi.

7. The optical communication cable bundle of claim 1, wherein the second extrudable polymer material of the bundle jacket includes a smoke reducing material.

8. The optical communication cable bundle of claim 1, wherein the second extrudable polymer material of the bundle jacket is a PVC material and the first extrudable polymer material of the subunit jacket is a PVC material.

9. The optical communication cable bundle of claim 1, further comprising at least four optical fiber subunits, wherein each optical fiber subunit includes at least eight optical fibers.

10. The optical communication cable bundle of claim 9, wherein each subunit includes the same number of optical fibers.

11. A method of manufacturing an optical communication cable bundle comprising:
   extruding an outermost bundle layer around a plurality of optical fiber subunits, each optical fiber subunit comprising:
      a subunit jacket defining a subunit passage; and
      a plurality of optical fibers located with the subunit passage, wherein a thickness of the outermost bundle layer is less than a thickness of each of the subunit jackets and the outermost bundle layer is extruded tight around the subunit jackets to couple the subunits and the outermost bundle layer;
   forming each of the subunit jackets from a first extrudable polymer material and forming the bundle layer from a second extrudable polymer material, wherein the first extrudable polymer material includes a fire resistant material having an oxygen limiting index of greater than 40%, wherein the second extrudable polymer material has an oxygen limiting index of less than 40%; and
   applying a vacuum pressure during extrusion to a bundle passage of the outermost bundle layer to draw an inner surface of the outermost bundle layer tight against the subunit jackets of the plurality of optical fiber subunits, wherein each subunit jacket has a tensile strength and a tear strength and the outermost bundle layer has a tensile strength and a tear strength, wherein the tensile strength of the outermost bundle layer is less than the tensile strength of the subunit jacket, wherein the tear strength of the outermost bundle layer is less than the tear strength of the subunit jacket.

12. The method of manufacturing an optical communication cable bundle of claim 11, wherein a thickness of the outermost bundle layer is less than 70% of a thickness of the subunit jacket, and wherein the tensile strength of the outermost bundle layer is less than 80% of the tensile strength of the subunit jacket.

13. The method of manufacturing an optical communication cable bundle of claim 12, wherein the thickness of the outermost bundle layer is between 0.05 mm and 0.35 mm, and the thickness of the subunit jacket is between 0.25 mm and 0.5 mm, and further wherein the tensile strength of the outermost bundle layer is less than 2000 psi and the tensile strength of the subunit jacket is greater than 2200 psi.

14. The method of manufacturing an optical communication cable bundle of claim 11, wherein the second polymer material includes a smoke reducing material.

* * * * *